United States Patent
Kawabata (10) Patent No.: US 9,896,144 B2
(45) Date of Patent: Feb. 20, 2018

(54) STRADDLE-TYPE VEHICLE

(71) Applicant: KAWASAKI JUKOGYO KABUSHIKI KAISHA, Kobe-shi, Hyogo (JP)

(72) Inventor: Hiroki Kawabata, Kakogawa (JP)

(73) Assignee: Kawasaki Jukogyo Kabushiki Kaisha, Kobe-shi, Hyogo (JP)

(*) Notice: Subject to any disclaimer, the term of this patent is extended or adjusted under 35 U.S.C. 154(b) by 0 days.

(21) Appl. No.: 14/655,191

(22) PCT Filed: Dec. 25, 2012

(86) PCT No.: PCT/JP2012/008250
§ 371 (c)(1),
(2) Date: Jun. 24, 2015

(87) PCT Pub. No.: WO2014/102852
PCT Pub. Date: Jul. 3, 2014

(65) Prior Publication Data
US 2015/0329168 A1 Nov. 19, 2015

(51) Int. Cl.
*B62K 19/30* (2006.01)
*B62J 11/00* (2006.01)
*B62M 6/90* (2010.01)

(52) U.S. Cl.
CPC .............. *B62J 11/00* (2013.01); *B62K 19/30* (2013.01); *B62M 6/90* (2013.01); *B62K 2204/00* (2013.01); *B62K 2208/00* (2013.01)

(58) Field of Classification Search
CPC .................................. B62K 19/30; B62J 11/00
(Continued)

(56) References Cited

U.S. PATENT DOCUMENTS

| 2004/0084239 A1* | 5/2004 | Hioki ................ B62K 5/01 180/291 |
| 2010/0018787 A1* | 1/2010 | Plazotta .............. B60L 11/18 180/65.6 |

(Continued)

FOREIGN PATENT DOCUMENTS

| JP | H09226382 A | 9/1997 |
| JP | 2004210074 A | 7/2004 |

(Continued)

OTHER PUBLICATIONS

Machine translation of JP 09226382 A.*
(Continued)

*Primary Examiner* — Kawing Chan
(74) *Attorney, Agent, or Firm* — Alleman Hall Creasman & Tuttle LLP (57) ABSTRACT

A straddle-type vehicle includes: a seat to be straddled and sat upon by a rider; an electric motor configured to generate traveling power for driving a wheel; a battery case arranged in front of the seat and accommodating a battery storing DC power to be supplied to the electric motor; and a charging connector which is arranged above the battery and through which the battery is charged from an external power supply, wherein the charging connector includes a connector connection surface to which a power supply connector of the external power supply is connected and which faces a vehicle width direction, and the charging connector is attachable to and detachable from a vehicle body integrally with the battery.

7 Claims, 6 Drawing Sheets (58) Field of Classification Search
USPC .......................................................... 318/139
See application file for complete search history.

(56) References Cited

U.S. PATENT DOCUMENTS

| | | | | |
|---|---|---|---|---|
| 2012/0000720 | A1* | 1/2012 | Honda | B62K 11/10 |
| | | | | 180/65.1 |
| 2012/0067659 | A1* | 3/2012 | Ogura | B06B 1/16 |
| | | | | 180/291 |
| 2012/0097463 | A1* | 4/2012 | Iwata | B60K 1/00 |
| | | | | 180/65.1 |
| 2012/0103706 | A1* | 5/2012 | Kondo | B62M 7/12 |
| | | | | 180/65.1 |
| 2013/0270022 | A1 | 10/2013 | Matsuda | |

FOREIGN PATENT DOCUMENTS

| | | | | |
|---|---|---|---|---|
| JP | 2010018270 | A | 1/2010 | |
| JP | 2012096594 | A | 5/2012 | |
| JP | WO 2013098876 | A1* | 7/2013 | ........... G01R 31/025 |
| KR | 1020080068156 | A | 7/2008 | |
| WO | 2012085976 | A1 | 6/2012 | |
| WO | 2012090244 | A1 | 7/2012 | |
| WO | 2014054204 | A1 | 4/2014 | |

OTHER PUBLICATIONS

ISA Japanese Patent Office, International Search Report Issued in Application No. PCT/JP2012/008250, Apr. 2, 2013, WIPO, 4 pages.
European Patent Office, Extended European Search Report Issued in Application No. 12891189.8, Oct. 7, 2016, Germany, 11 pages.
State Intellectual Property Office of the People's Republic of China, Office Action and Search Report Issued in Application No. 201280077917.0, Feb. 4, 2017, 7 pages. (Submitted with Translation of Search Report).

* cited by examiner

STRADDLE-TYPE VEHICLE

TECHNICAL FIELD

The present invention relates to a straddle-type vehicle configured to drive a wheel with power generated by an electric motor.

BACKGROUND ART

According to an electric motorcycle of PTL 1, a covering member is provided between a handle and a seat, and a charging connector is arranged at a portion which is exposed by detaching a lid body of an opening portion formed at an upper end portion of the covering member. Accordingly, a rider sandwiching the covering member with his/her legs feels the same as when knee-gripping an engine-driven motorcycle.

CITATION LIST

Patent Literature

PTL 1: Japanese Laid-Open Patent Application Publication No. 2004-210074

SUMMARY OF INVENTION

Technical Problem

According to the electric motorcycle of PTL 1, the charging connector faces upward at the upper end portion of the covering member. Therefore, when connecting a power supply connector to the charging connector, the power supply connector to which a power supply cable is connected needs to be temporarily lifted up high and then connected to the charging connector from an upper side to a lower side. Thus, charging work requires labor. Further, the charging connector attached to a vehicle body is connected to a battery through an electric wire and the like. Therefore, when attaching or detaching the battery to or from the vehicle body, connection between the battery and the charging connector needs to be cut off. Thus, the work of attaching and detaching the battery becomes complex.

An object of the present invention is to facilitate charging work and the work of attaching and detaching a battery in a straddle-type vehicle in which a charging connector is arranged in front of a seat.

Solution to Problem

A straddle-type vehicle according to the present invention includes: a seat to be straddled and sat upon by a rider; an electric motor configured to generate traveling power for driving a wheel; a battery case arranged in front of the seat and accommodating a battery storing DC power to be supplied to the electric motor; and a charging connector which is arranged above the battery and through which the battery is charged from an external power supply, wherein the charging connector includes a connector connection surface to which a power supply connector of the external power supply is connected and which faces a vehicle width direction, and the charging connector is attachable to and detachable from a vehicle body integrally with the battery.

According to the above configuration, the connector connection surface of the charging connector arranged in front of the seat and above the battery faces the vehicle width direction. Therefore, even in a case where the charging connector is arranged above the battery, the power supply connector to which the power supply cable is connected does not have to be temporarily lifted up higher than the vehicle body. Thus, the charging work can be easily performed. Further, when attaching the battery to or detaching the battery from the vehicle body, the charging connector can be attached or detached together with the battery. Therefore, the battery can be attached to or detached from the vehicle body more easily than a case where the charging connector is fixed to the vehicle body. In addition, the battery can be easily charged in a state where the battery is detached from the vehicle body.

The straddle-type vehicle may be configured such that: the battery case is attachable to and detachable from the vehicle body together with the battery; and the charging connector is provided outside the battery case.

According to the above configuration, a waterproof property in the battery case can be improved while arranging the charging connector integrally with the battery.

The straddle-type vehicle may further include an electric component arranged above the battery case, wherein the charging connector is arranged behind the electric component and in front of the seat.

According to the above configuration, while securing an arrangement space of the electric component, the charging connector can also be arranged.

The straddle-type vehicle may further include: an electric component cover attached at an upper side of the battery case, an electric component space being formed between the electric component cover and the battery case, the electric component space accommodating the electric component; and an upper cover provided in front of the seat and covering the electric component cover, wherein: the charging connector is arranged outside and behind the electric component cover and inside the upper cover; and a rear portion of the upper cover is provided with a connector opening portion through which the connector connection surface of the charging connector is exposed toward one side, and a connector lid portion configured to close the connector opening portion.

According to the above configuration, the charging connector is arranged outside the electric component cover and inside the upper cover. Therefore, the charging connector which needs to be exposed at the time of the charging work can be arranged outside the electric component space which needs to be waterproofed, and the charging connector can be covered with the upper cover to be accommodated compactly.

The straddle-type vehicle may be configured such that the rear portion of the upper cover at which the connector lid portion is provided is smaller in size in the vehicle width direction than a middle portion of the upper cover which covers the electric component cover.

According to the above configuration, the rider seated on the seat can sandwich the upper cover with his/her legs to easily maintain a stable posture as in the case of the conventional fuel tank. Thus, while arranging the electric component and the charging connector in front of the seat, controllability can be improved.

The straddle-type vehicle may be configured such that: the upper cover includes a projecting wall portion projecting from a peripheral edge of the connector opening portion, formed at an outer wall portion of the upper cover, toward an internal space covered with the upper cover; and the charging connector is arranged at the internal space side of a passage defined by the projecting wall portion.

According to the above configuration, a grip of the power supply connector of the external power supply can be located as close as possible to the vehicle body. Thus, a space required at the time of the charging can be reduced. Even in a case where the upper cover has such a shape that the middle portion thereof is larger than the rear portion thereof, the electric component cover and the like are difficult to see from outside by the projecting wall portion with the connector lid portion open.

Advantageous Effects of Invention

As is clear from the above explanations, according to the present invention, a battery can be easily attached to and detached from a vehicle body, and an external power supply connector can be easily attached to and detached from a connector connection portion.

DESCRIPTION OF EMBODIMENTS

Hereinafter, an embodiment will be explained in reference to the drawings.

Figure 1:
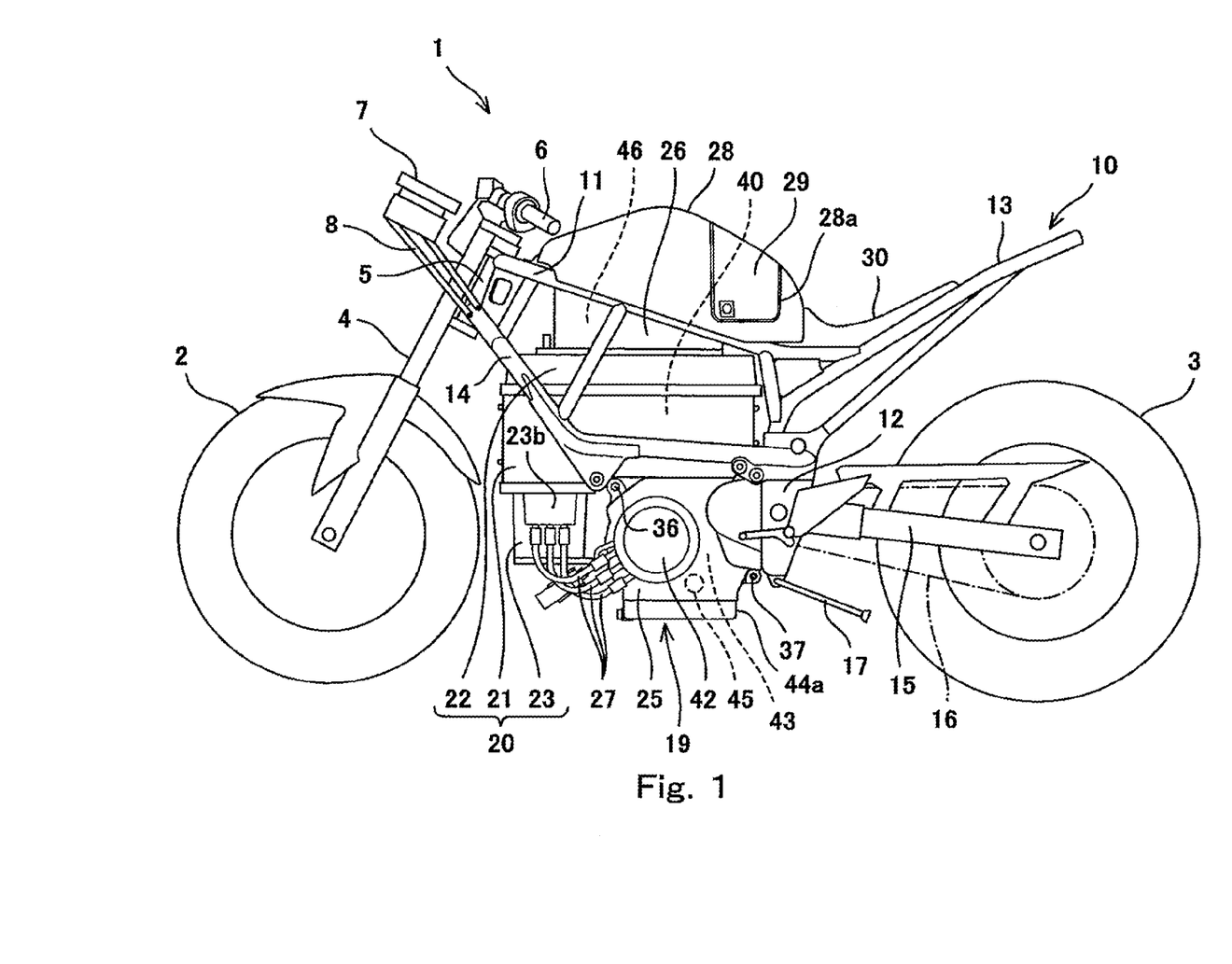
FIG. 1 is a left side view of an electric motorcycle according to an embodiment.

FIG. 1 is a right side view of an electric motorcycle 1 according to an embodiment of the present invention. As shown in FIG. 1, the electric motorcycle 1 that is a straddle-type electric vehicle is a motorcycle including a front wheel 2 as a driven wheel and a rear wheel 3 as a driving wheel. The front wheel 2 is rotatably supported by a lower end portion of a front fork 4. An upper portion of the front fork 4 is integrated with a steering shaft (not shown), and the steering shaft is inserted in a head pipe 5 of a vehicle body to be rotatably supported by the head pipe 5. A bar-type handle 6 extending in a left/right direction is attached to the steering shaft, and an accelerator grip 6a (see FIG. 2) is provided at a right portion of the handle 6. A display device 7 is arranged in front of and in the vicinity of the handle 6. The display device 7 displays a traveling speed, a motor rotation speed, a state of charge of a battery, and the like. The display device 7 is supported by a vehicle body frame 10 via a bracket 8 and is located in front of the head pipe 5.

The vehicle body frame 10 of the electric motorcycle 1 includes a pair of main frames 11. The main frames extend rearward from the head pipe 5 to a left side and a right side while slightly inclining downward. A pair of left and right down frames 14 are connected to front end portions of the main frames 11. The left and right down frames 14 extend downward from the front end portions of the main frames 11 and then extend rearward. Rear end portions of the main frames 9 are connected to an upper portion of a frame-shaped pivot frame 12. A front end portion of a swing arm 15 which supports the rear wheel 3 is supported by the pivot frame 12 such that the swing arm 15 is swingable in an upper/lower direction. A rear frame 13 connected to the rear end portions of the main frames 11 is provided above the swing arm 15. A side stand 17 is provided at the pivot frame 12. The side stand 17 can tilt between a use position and a non-use position. In the use position, the side stand 17 supports the vehicle body of the electric motorcycle 1 in a state where the vehicle body is inclined toward one side (left side in the present embodiment).

The vehicle body frame 10 supports a power unit 19 in a space between the head pipe 5 and the pivot frame 12. The power unit 19 is a unit configured by integrating a plurality of batteries 40, an electric motor 42, an inverter 47 (see FIG. 3), a charging connector 75, and the like. The plurality of batteries 40 are accommodated in a battery case 20. The battery case 20 includes a middle case 21, an upper case 22, and a lower case 23. The middle case 21 has a tubular shape which is open in the upper/lower direction, and a lower end of a rear region of the middle case 21 is closed. The upper case 22 is attached to the middle case 21 so as to close an upper opening of the middle case 21. The lower case 23 is attached to the middle case 21 so as to close a lower opening of a front region of the middle case 21.

A motor unit 25 is attached to the battery case 20 so as to be located behind the lower case 23 and under the middle case 21. Specifically, the motor unit 25 is fixed to a frame body 32 of the middle case 21 and the pivot frame 12 by brackets 36 and 37. The motor unit 25 includes a casing 44, the electric motor 42, a transmission 43, an oil pan 44a, and an oil pump 45. The electric motor 42 is accommodated in the casing 44 and generates traveling power. The transmission 43 is accommodated in the casing 44 and changes rotational power output from the electric motor 42. The oil pan 44a is provided at a lower portion of the casing 44. The oil pump 45 suctions oil in the oil pan 44a to eject the oil. The rotational power output from the transmission 43 is transmitted to the rear wheel 3 via a chain 16.

An electric component cover 26 is attached to an upper surface of the battery case 20. An electric component space which accommodates an electric component group 46 is formed between the electric component cover 26 and the upper case 22. The electric component cover 26 has an insulation property and is made of, for example, an insulating resin material. The electric component cover 26 is covered with an upper cover 28 that is a dummy tank which is similar in appearance to a fuel tank of a conventional engine type motorcycle. To prevent mischief, the upper cover 28 is locked to the vehicle body by a key. The upper cover 28 is made of, for example, a metal material. The electric component cover 26 is lower in strength than the upper cover 28. A connector opening portion 28a which exposes the below-described charging connector 75 (see FIG. 2) is formed at a rear portion of the upper cover 28. The connector opening portion 28a is closed by a connector lid portion 29. A rider's seat 30 supported by the rear frame 13 is provided behind the upper cover 28. The rider seated on the seat 30 can sandwich the upper cover 28 with his/her legs. The upper surface of the battery case 20 is arranged higher than an upper surface of the motor unit 25 but lower than an upper end of the seat 30. With this, even in a case where the electric component group 46 including the inverter 47 and the like is arranged on the battery case 20, the amount of projection of the electric component group 46 above a virtual line formed by connecting the seat 30 and the head pipe 5 can be suppressed.

The batteries 40 are arranged between the head pipe 5 and the seat 30. At least a part of the batteries 40 is arranged above and in front of a footrest of the vehicle body and is located between both knees of the rider seated on the seat 30. The electric motor 42 is arranged between the head pipe 5 and the seat 30. The electric motor 42 is supported at the pivot frame 12 side and does not swing together with the swing arm 15.

Figure 2:
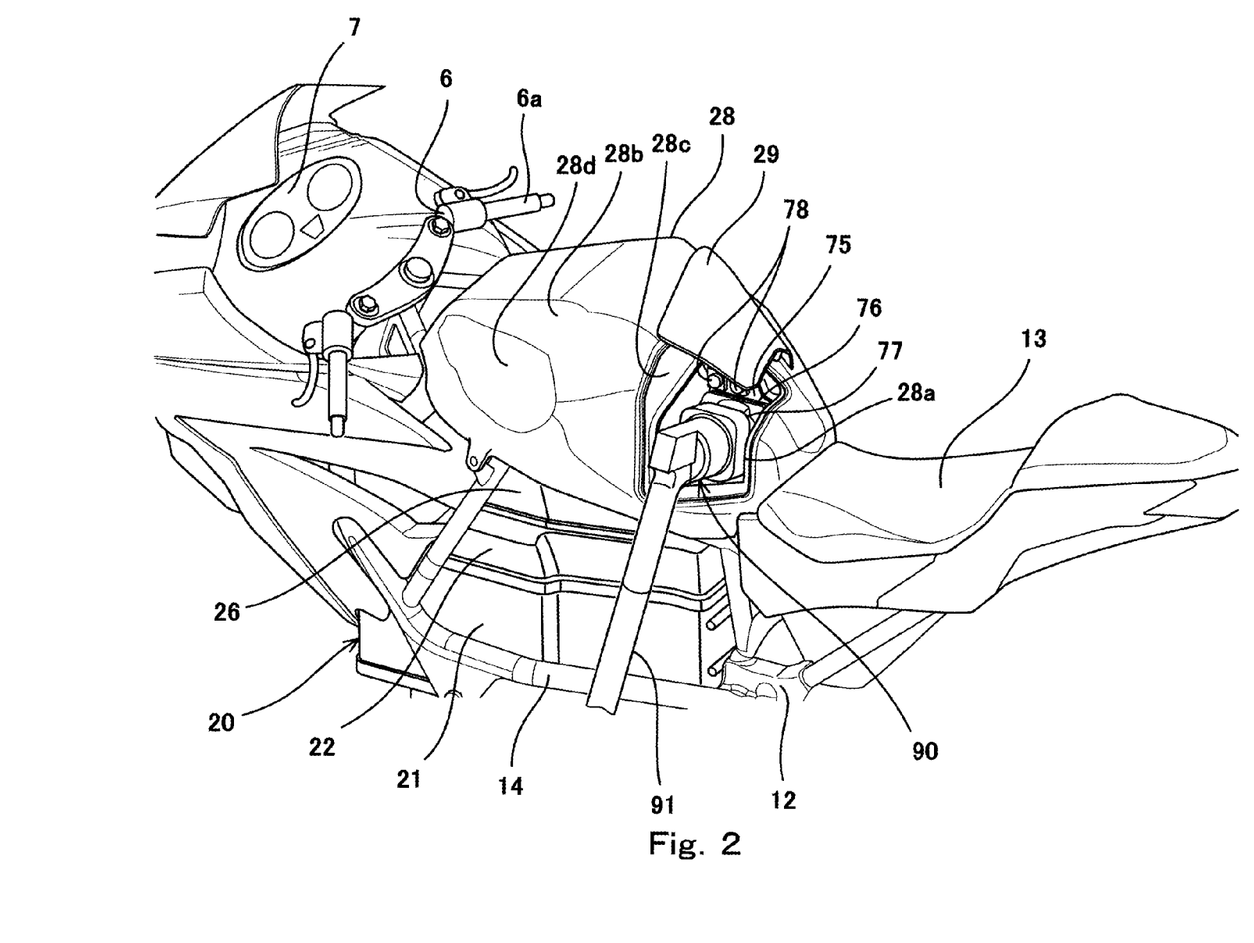
FIG. 2 is a perspective view which shows major components in a state where a connector lid portion of the electric motorcycle of FIG. 1 is open.

FIG. 2 is a perspective view showing major components in a state where the connector lid portion 29 of the electric motorcycle 1 shown in FIG. 1 is open. The charging connector 75 is accommodated in a rear portion of a space covered with the upper cover 28. The charging connector 75 constitutes a part of a supply path through which electric power supplied from an external power supply (not shown) is introduced to the batteries 40. The charging connector 75 is connected to a power supply connector 90 of the external power supply. Thus, the external power supply and the batteries 40 are electrically connected to each other. The charging connector 75 and the power supply connector 90 are formed to realize such an engagement structure as to be attachable to and detachable from each other. The charging connector 75 is electrically connected to the batteries 40 through internal wires, and the power supply connector 90 is electrically connected to the external power supply through a power supply cable 91 that is an external wire.

A connector opening portion 28*a* of the upper cover 28 is formed to extend from a side wall of the rear portion of the upper cover 28 to an upper wall of the rear portion of the upper cover 28. The connector lid portion 29 has an L-shaped cross section so as to close the connector opening portion 28*a*. The upper cover 28 includes a projecting wall portion 28*c* which projects from a peripheral edge of the connector opening portion 28*a*, formed at an outer wall portion 28*b* of the upper cover 28, toward the internal space covered with the upper cover 28. The charging connector 75 is arranged at the internal space side of a passage defined by the projecting wall portion 28*c*. The projecting wall portion 28*c* is arranged behind the electric component cover 26. The charging connector 75 is arranged behind the electric component cover 26 and in front of the seat 30.

A width of the charging connector 75 in a vehicle width direction is smaller than a width of the electric component cover 26 in the vehicle width direction. Therefore, the rear portion of the upper cover 28 at which the connector lid portion 29 is provided is smaller in size in the vehicle width direction than a middle portion of the upper cover 28 which covers the electric component cover 26. Depressed portions 28*d* are formed on an outer surface of a front portion of the upper cover 28 so as to be located on an extended line of an operation trajectory of the handle 6. Thus, the upper cover 28 does not interfere with a rotational operation of the handle 6. The charging connector 75 is provided in such a direction that when the vehicle body of the electric motorcycle 1 is in a vertical posture, a connector connection surface 76 is inclined so as to face upward. Then, the charging connector 75 is provided at such an angle that when the vehicle body is inclined toward one side by using the side stand 17 (see FIG. 1), the connector connection surface 76 faces a horizontal direction. With this, a user can perform the charging work when using the side stand 17 (see FIG. 1). An inner lid 79 which directly closes the connector connection surface 76 is attached to the charging connector 75.

Figure 3:
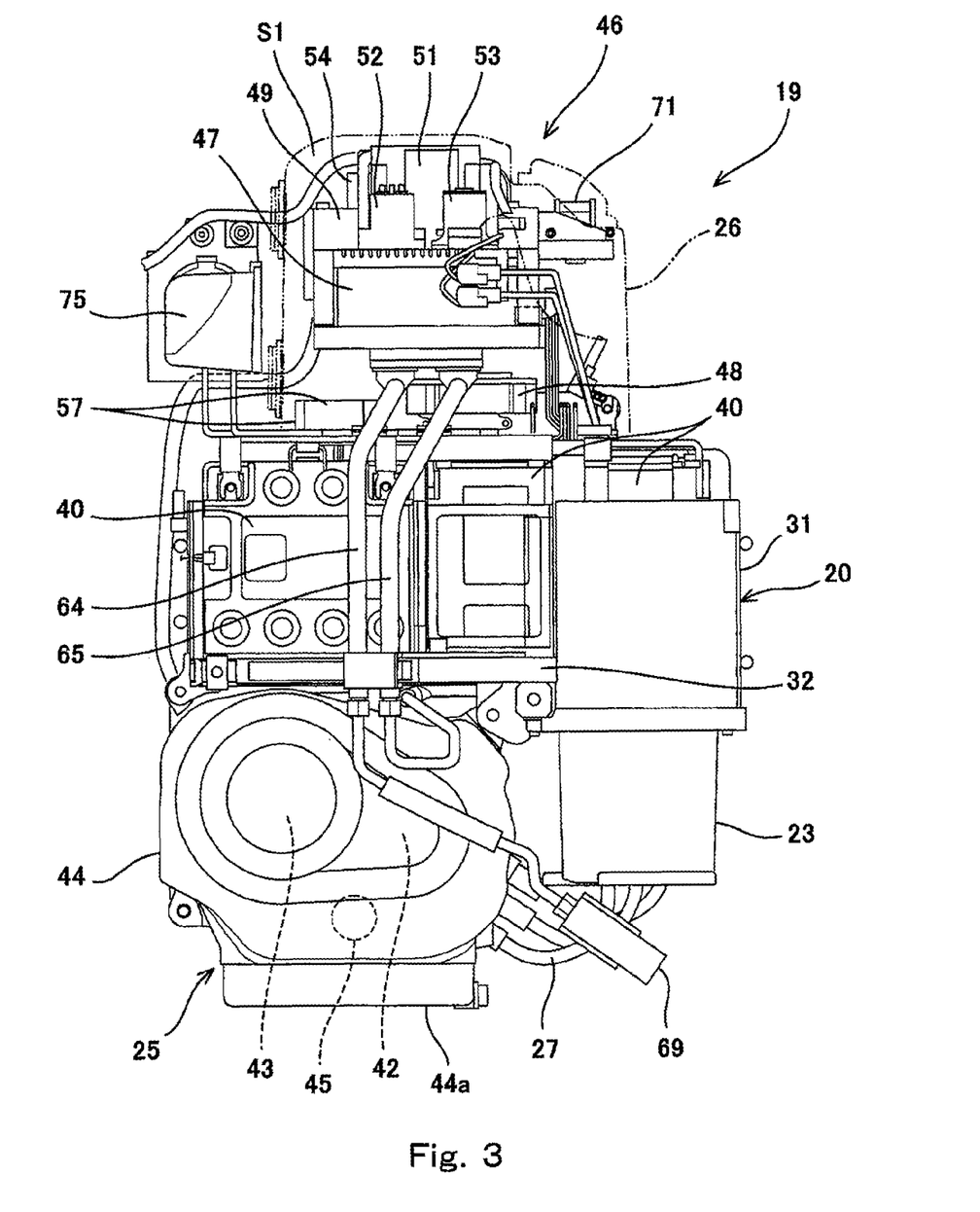
FIG. 3 is a right side view of a power unit of the electric motorcycle of FIG. 1.
Figure 4:
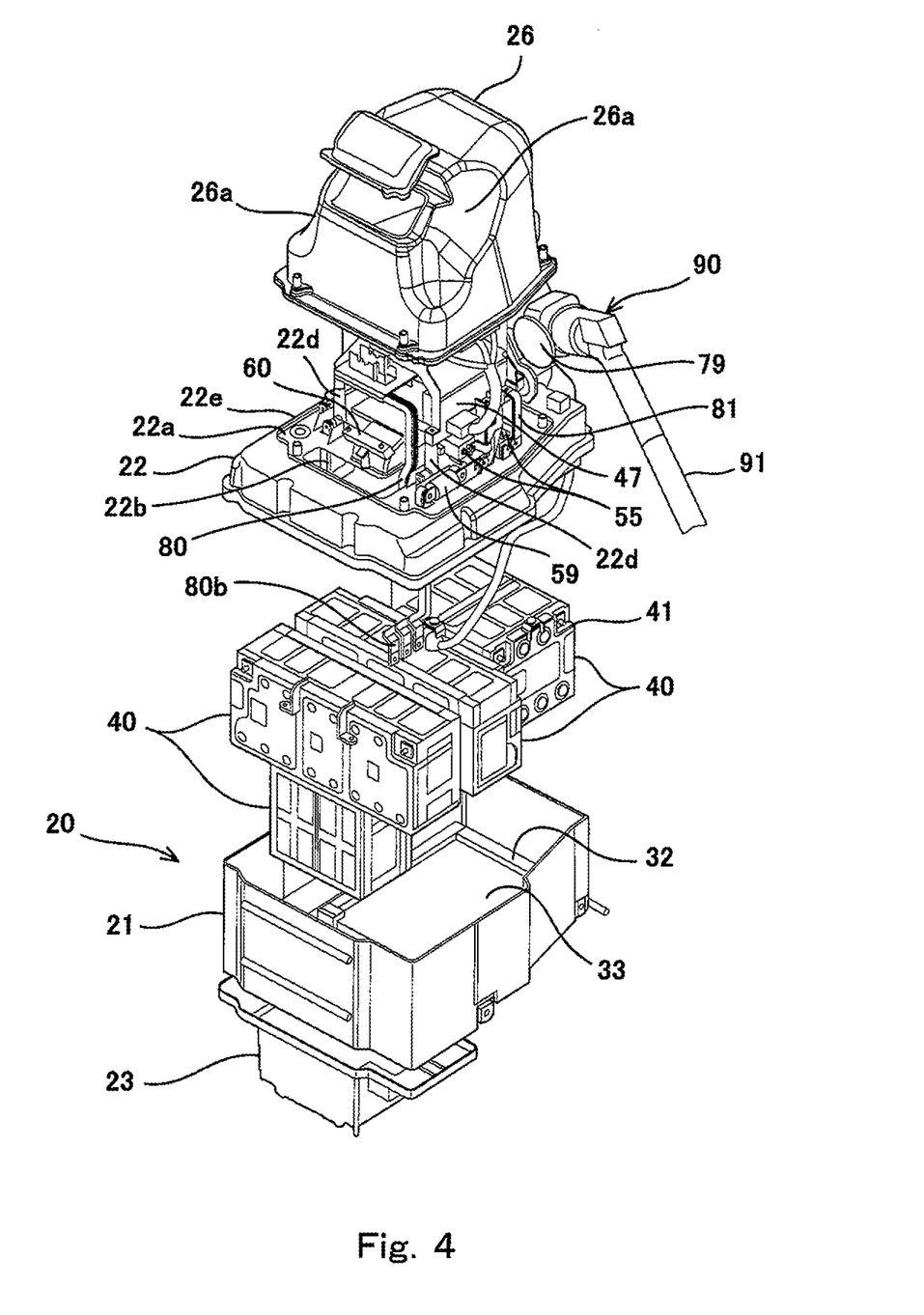
FIG. 4 is an exploded perspective view of the power unit of the electric motorcycle of FIG. 1 when viewed from a front left side (an electric motor device is not shown).
Figure 5:
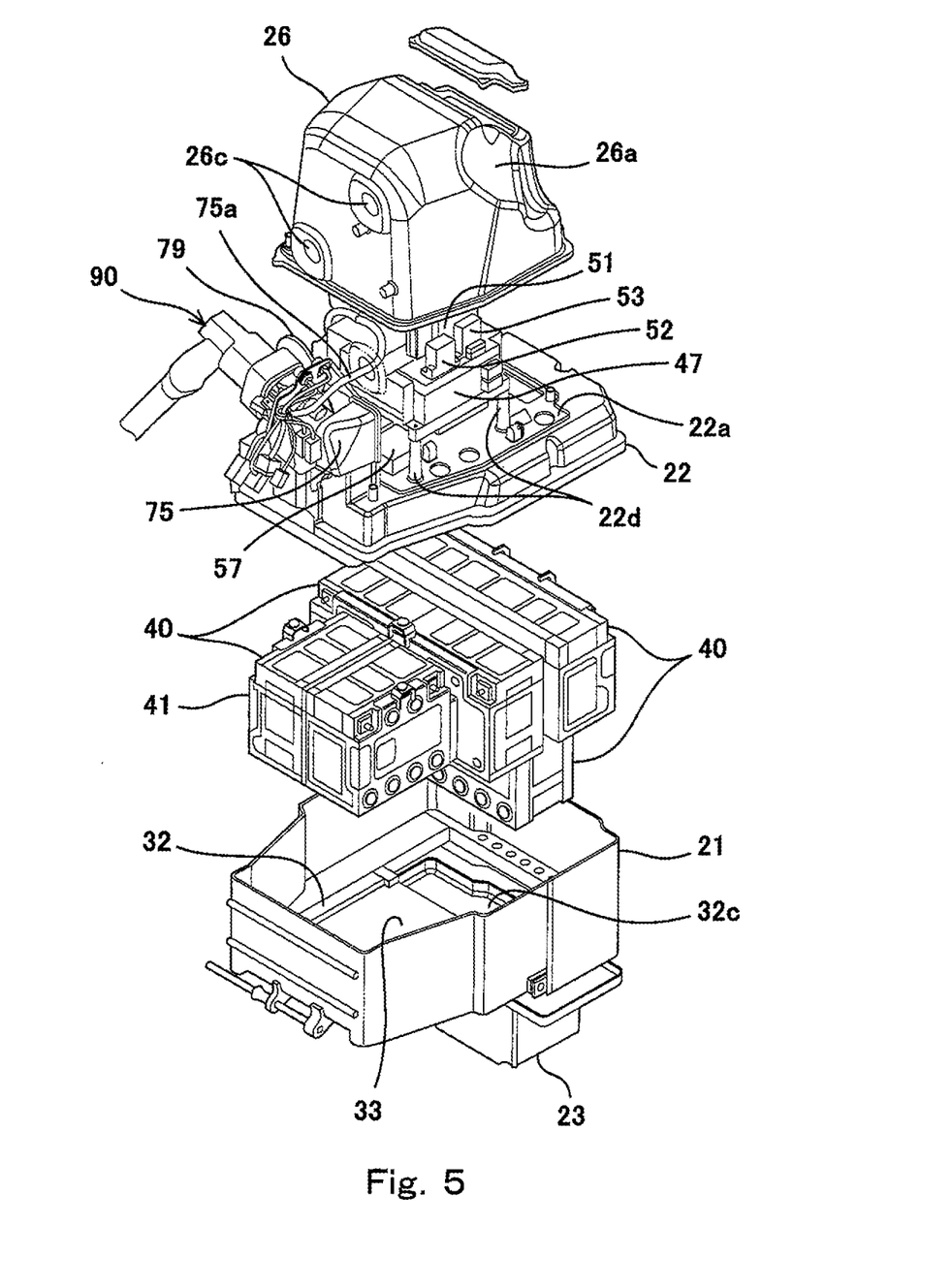
FIG. 5 is an exploded perspective view of the power unit of the electric motorcycle of FIG. 1 when viewed from a rear right side (the electric motor device is not shown).
Figure 6:
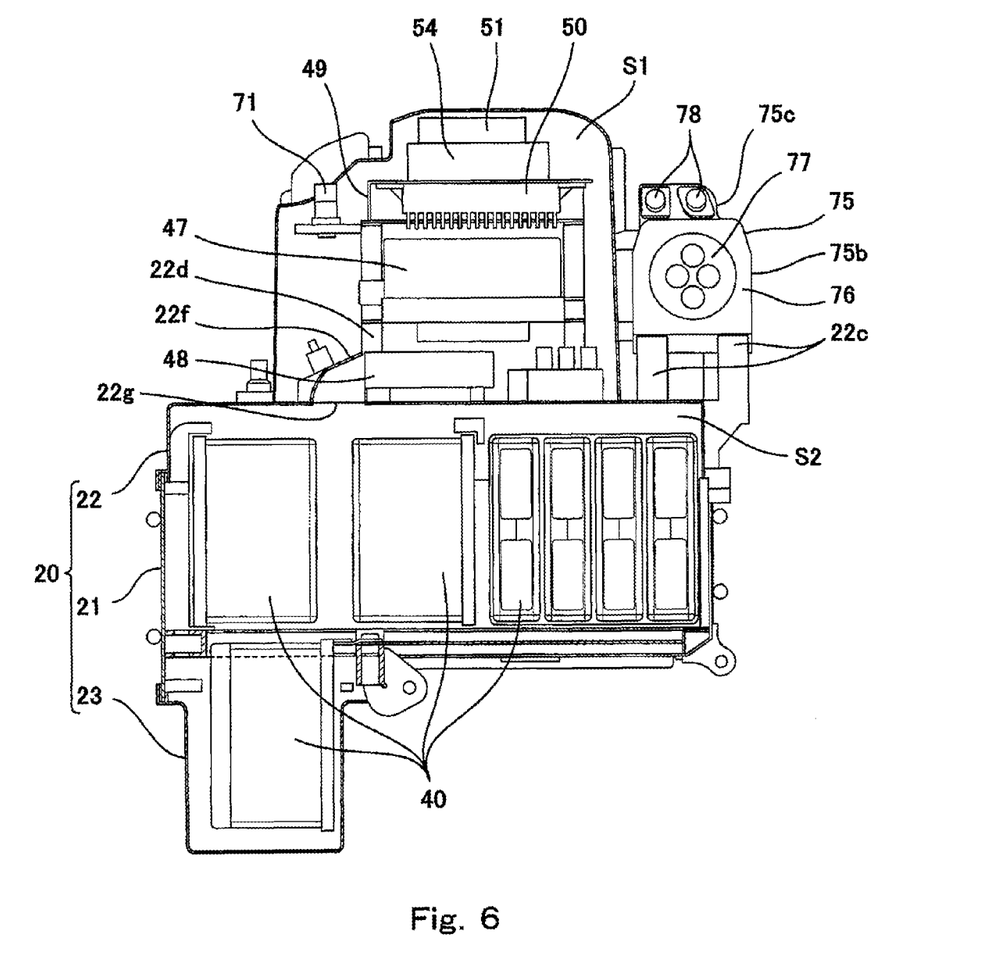
FIG. 6 is a longitudinal sectional view of the power unit of the electric motorcycle of FIG. 1 when viewed from a left side (the electric motor device is not shown).

FIG. 3 is a right side view of the power unit 19 of the electric motorcycle 1 of FIG. 1. FIG. 4 is an exploded perspective view of the power unit 19 of the electric motorcycle 1 of FIG. 1 when viewed from a front left side (the motor unit 25 is not shown). FIG. 5 is an exploded perspective view of the power unit 19 of the electric motorcycle 1 of FIG. 1 when viewed from a rear right side (the motor unit 25 is not shown). FIG. 6 is a longitudinal sectional view of the power unit 19 of the electric motorcycle 1 of FIG. 1 when viewed from a left side (the motor unit 25 is not shown). As shown in FIGS. 3 to 6, the plurality of batteries 40 which store DC power to be supplied to the electric motor 42 are aligned and arranged in a battery space S2 inside the battery case 20 so as to be electrically connected to one another in series. The plurality of batteries 40 are integrated as an assembly by a casing 41 to constitute a battery group. The battery group is arranged such that a front portion thereof is wider in the vehicle width direction (left/right direction) than a rear portion thereof. With this, while increasing the total of the capacities of the batteries 40, a size of the total of the batteries 40 in the upper/lower direction is prevented from increasing. In accordance with this, each of the middle case 21 and the upper case 22 is formed to have such a shape that a front portion thereof is wider than a rear portion thereof. With this, the rider seated on the seat 30 easily sandwiches the vehicle body with his/her legs.

The middle case 21 includes a case main body 31 and the frame body 32. The case main body 31 has a rectangular tube shape and is made of metal. The frame body 32 is provided inside the case main body 31 and made of metal. The frame body 32 is arranged at a lower portion of the middle case 21 along the horizontal direction. The batteries 40 accommodated in the middle case 21 are supported by the frame body 32 from below. In addition, the frame body 32 of the middle case 21 is fixed to the down frames 14 (see FIG. 1). To be specific, the frame body 32 that is a part of the battery case 20 constitutes a part of the vehicle body frame 10.

A rear portion of a region surrounded by the frame body 32 of the middle case 21 is closed by a bottom plate 33 which is fixed to the frame body 32 by welding and made of metal. A front portion of the region surrounded by the frame body 32 of the middle case 21 forms an opening portion 32*c* which communicates with an internal space of the lower case 23. The batteries 40 are accommodated in the middle case 21 and the upper case 22 so as to be placed on the frame body 32 and the bottom plate 33, and the batteries 40 are also accommodated in the lower case 23. To be specific, the middle case 21 and the upper case 22 constitute an upper battery accommodating portion, and the lower case 23 constitutes a lower battery accommodating portion. The lower case 23 that is the lower battery accommodating portion is shorter in the front/rear direction than each of the middle case 21 and the upper case 22 which constitute the upper battery accommodating portion. The lower case 23 is connected to a front lower portion of the middle case 21. The motor unit 25 is arranged immediately behind the lower case 23 and immediately under the middle case 21.

An electric component arrangement region 22*a* surrounded by a peripheral rib 22*e* is formed on an upper surface of the upper case 22 of the battery case 20. The upper surface of the upper case 22 is covered with the electric component cover 26 along the peripheral rib 22*e*, and an electric component space S1 is thus formed. Depressed portions 26*a* are formed at the electric component cover 26 so as to correspond to the depressed portions 28*d* of the upper cover 28. The electric component group 46 is arranged in the electric component space S1. To be specific, the electric component group 46 is arranged above the batteries 40 so as to overlap the batteries 40 in a plan view. The electric component group 46 includes an electric component which is related to a high-voltage current of the batteries 40 and through which the high-voltage current flows. For example, the electric component group 46 includes at least one of the inverter 47 (switching device), a DCDC converter 50 (transformer), an electrical leak sensor 51, a DCDC converter relay 52, a varistor 53, discharging system relays 55, charging system relays 57, a fuse 59, a precharge resistor 60, and a service plug 71. In the present embodiment, the electric component group 46 includes all of these components. In addition, the electric component group 46 may include an electric component related to a low-voltage current. In the present embodiment, the electric component group 46 includes a blower fan 48 and an ECU 54 (controller).

A pedestal portion 22c is provided on the upper surface of the upper case 22 of the battery case 20 so as to be located behind the electric component cover 26 and project upward. The charging connector 75 by which the batteries 40 are charged from outside is attached to the pedestal portion 22c. Since the pedestal portion 22c is integrated as a connector mount portion with the battery case 20, it is advantageous in that the number of parts is reduced. The charging connector 75 is arranged immediately behind the electric component cover 26 so as to overlap the electric component cover 26 in a rear view. The charging connector 75 is located outside the battery case 20, is integrated with the battery case 20, and constitutes a part of the power unit 19. The charging connector 75 is arranged above the batteries 40 so as to overlap the batteries 40 in a plan view. Therefore, the charging connector 75 is attachable to and detachable from the vehicle body integrally with the battery case 20. Through-holes 26c are formed on a rear wall portion of the electric component cover 26. An electric wire 75a of the charging connector 75 is introduced through the through-hole 26c in the front/rear direction to the electric component space S1.

The charging connector 75 is arranged outside and behind the electric component cover 26 and inside the upper cover 28 (see FIG. 1). The charging connector 75 is provided with the connector connection surface 76 to which the power supply connector is connected. The connector connection surface 76 faces the vehicle width direction (in the left direction in the present embodiment). The connector connection surface 76 is provided with a quick charging connector portion 77 and a normal charging connector 78. The quick charging connector portion 77 and the normal charging connector 78 are arranged so as to be lined up in the upper/lower direction. To be specific, a high-voltage connector and a low-voltage connector are integrally, individually provided at the charging connector 75. The power supply connector 90 for quick charging is connected to the quick charging connector portion 77. The power supply connector 90 has an L shape such that the cable 91 connected to the external power supply extends downward. The quick charging connector portion 77 is a connector to which a voltage equal to the voltage of the batteries 40 is applied. The normal charging connector 78 is a connector to which a voltage (for example, a low voltage) different from the voltage of the batteries 40 is applied. A casing of the charging connector 75 includes a lower rear surface 75b and an upper rear surface 75c. The upper rear surface 75c is located in front of the lower rear surface 75b. With this, a rear surface of the upper cover 28 is easily formed to have such a shape as to be inclined upward in front. Thus, a comfortable driving position can be secured.

The fan 48 is provided at a middle of the electric component arrangement region 22a of the upper surface of the upper case 22 of the battery case 20. An air inlet 22g through which the electric component space S1 and the battery space S2 communicate with each other is formed on an upper wall of the upper case 22. The fan 48 causes the air in the electric component space S1 to flow into the battery space S2 through the air inlet 22g. A duct portion 22f is formed at the upper case 22. The duct portion 22f forms a path between a discharge port of the fan 48 and the air inlet 22g.

A pair of discharging system relays 55 and a pair of charging system relays 57 are arranged at the electric component arrangement region 22a. The discharging system relays 55 are interposed in an energizing path between the batteries 40 and the inverter 47. The charging system relays 57 are interposed in an energizing path between the charging connector 75 and the batteries 40. Since the charging system relays 57 are arranged in the electric component cover 26 so as to be isolated from the charging connector 75, a waterproof property thereof is good. The fuse 59 interposed in a power supply circuit and the precharge resistor 60 are arranged at the other portions of the electric component arrangement region 22a. A plurality of post portions 22d for providing the inverter 47 project upward at the electric component arrangement region 22a. A pair of bus bars 81 as electric power lines is provided at the electric component arrangement region 22a so as to project upward. The pair of bus bars 81 is electrically connected to the batteries 40 through the discharging system relays 55, the fuse 59, the precharge resistor 60, and the like. A bus bar body 80 projects upward from the battery space S2 through an opening 22b formed at the electric component arrangement region 22a. The bus bar body 80 is formed by stacking and integrating, by insulating adhesion, three bus bars as electric power lines through which a three-phase alternating current is supplied from the inverter 47 to the electric motor 42. With this, handleability of the bus bar body 80 improves, and noise generation is suppressed.

The inverter 47 is provided on the post portions 22d. To be specific, the inverter 47 is arranged above the upper surface of the upper case 22 so as to be spaced part from the upper surface of the upper case 22. The inverter 47 converts DC power from the batteries 40 (see FIG. 3) into AC power to supply electric power to the electric motor 42 (see FIG. 3). The inverter 47 includes a semiconductor switching element. The inverter 47 is arranged above the batteries 40 so as to overlap the battery case 20 in a plan view. The inverter 47 is arranged above the battery case 20 so as to be located within the battery case 20 in a plan view.

The inverter 47 is arranged above the fan 48, the discharging system relays 55, and the charging system relays 57 so as to overlap the fan 48, the discharging system relays 55, and the charging system relays 57 in a plan view. To be specific, the fan 48, the discharging system relays 55, and the charging system relays 57 are arranged between the battery case 20 and the inverter 47. With this, a large number of electric components can be arranged in the electric component arrangement region 22a that is small in area. In addition, electric wires and the like connecting these electric components to one another and electric wires and the like connecting these electric components to the batteries 40 can be made short. Three terminal portions (not shown) of the bus bar body 80 are respectively connected to output terminals of the inverter 47. Although not shown, a terminal portion of the bus bar 81 (see FIG. 9) is connected to an input terminal of the inverter 47.

A shield member 49 formed by bending a metal plate is provided above the inverter 47. A leg portion of the shield member 49 is placed on a portion of the inverter 47, the portion corresponding to the post portions 22*d*. The shield member 49 is formed in a step shape. The electrical leak sensor 51, the DCDC converter relay 52, and the varistor 53 are provided on an upper surface of a low wall portion of the shield member 49. The inverter 47 and the ECU 54 are provided on an upper surface of a high wall portion of the shield member 49. The ECU 54 controls various relays 52, 55, and 57, and the like. The DCDC converter 50 is attached to a lower surface of the high wall portion of the shield member 49.

The bus bar body 80 that is an electric power line for connecting the electric motor 42 (see FIG. 1) and the inverter 47 to each other extends through an internal space of the battery case 20 in the upper/lower direction. Terminal portions 80*b* of a lower end of the bus bar body 80 are arranged at a terminal accommodating portion 23*b* of the lower case 23. Three high-voltage electric power cables 27 (see FIG. 1) extend between the terminal portion 80*b* of the terminal accommodating portion 23*b* and a terminal portion (not shown) of the electric motor 42 so as to be located outside the battery case 20. Oil as a cooling medium circulates between the motor unit 25 and the inverter 47 through cooling medium pipes 64 and 65, the oil pump 45, an oil cooler 69, and the like.

According to the above-explained configuration, the connector connection surface 76 of the charging connector 75 arranged in front of the seat 30 and above the batteries 40 faces the vehicle width direction. Therefore, the power supply connector 90 to which the power supply cable 91 is connected does not have to be temporarily lifted up high. Thus, the charging work can be easily performed. The power supply cable 91 of the power supply connector 90 connected to the connector connection surface 76 does not project high in the upper direction. When the rider is seated on the seat 30, the field of vision of the rider who sees the display device 7 and the like in the vicinity of the handle 6 can be prevented from being blocked. Further, when attaching the batteries 40 to or detaching the batteries 40 from the vehicle body, the charging connector 75 can be attached or detached integrally with the batteries 40 and the battery case 20. Therefore, the batteries 40 can be attached or detached more easily than in a case where the charging connector 75 is provided at the vehicle body. In addition, the batteries 40 can be easily charged in a state where the batteries 40 are detached from the vehicle body.

Since the charging connector 75 is provided outside the battery case 20, the waterproof property of the battery case 20 can be improved while arranging the charging connector 75 integrally with the battery case 20. The charging connector 75 is arranged behind the electric component group 46 and in front of the seat 30, the electric component group 76 being arranged as plural layers lined up in the upper/lower direction so as to overlap one another in a plan view. Therefore, while securing an arrangement space of the electric component group 46, the charging connector 75 can also be arranged.

The charging connector 75 is arranged outside the electric component cover 26 and inside the upper cover 28. Therefore, the charging connector 75 which needs to be exposed at the time of the charging work can be arranged outside the electric component space S1 which needs to be waterproofed, and the charging connector 75 can be covered with the upper cover 28 to be accommodated compactly. Since the charging connector 75 is arranged behind the electric component cover 26, the charging connector 75 does not occupy an internal space of a front portion of the upper cover 28. Thus, the depressed portions 28*d* can be easily formed on the outer surface of the upper cover 28 such that the upper cover 28 does not interfere with the rotational operation of the handle 6.

The rear portion of the upper cover 28 at which the connector lid portion 29 is provided is smaller in size in the vehicle width direction than the middle portion of the upper cover 28 which covers the electric component cover 26. Therefore, the rider seated on the seat 30 can sandwich the upper cover with his/her legs to easily maintain a stable posture as in the case of the conventional fuel tank. Thus, while arranging the electric component group 46 and the charging connector 75 in front of the seat 30, controllability can be improved.

The charging connector 75 is arranged at the internal space side of the passage defined by the projecting wall portion 28*c* of the upper cover 28. Therefore, a grip of the power supply connector 90 can be located as close as possible to the vehicle body. Thus, a space required at the time of the charging can be reduced. Even in a case where the upper cover 28 has such a shape that the middle portion thereof is larger than the rear portion thereof, the electric component cover 26 and the like are difficult to see from outside by the projecting wall portion 28*c* with the connector lid portion 29 open.

The power supply cable 91 is formed so as to extend downward from the power supply connector 90 in a state where the power supply connector 90 is attached to the charging connector 75. Therefore, the space required at the time of the charging can be reduced. Further, the upper cover 28 is made of a metal material, so that in a case where the vehicle body falls down or collides with an obstacle, the charging connector 75 and the electric component group 46 can be protected. The charging connector 75 is arranged inside the upper cover 28 so as to be spaced part from an inner surface of the upper cover 28 in the left/right direction, and the connector lid portion 29 covers a surface larger in area than the charging connector 75. Therefore, a tip end of the charging connector 75 can be easily accommodated in the upper cover 28, and operations of attaching and detaching the charging connector 75 can be easily performed. The charging connector 75 is arranged inside the upper cover 28, and a portion of the upper cover 28 which is located in front of the charging connector 75 is formed so as to expand outward. Therefore, in a case where the vehicle body falls down to the left, the upper cover 28 contacts a ground surface, so that damages of the power supply connector 90 at the time of the falling can be suppressed. Since the charging connector 75 is arranged above the batteries 40, the charging connector 75 is protected more easily than in a case where the charging connector 75 is arranged under the batteries 40. Further, the charging connector 75 is arranged immediately in front of the seat 30 and faces toward the same side (the left side in the present embodiment) as the side stand 17. Therefore, the rider who is about to put up the side stand 17 and ride the vehicle can easily recognize whether or not the power supply connector 90 is connected. On this account, starting the driving operation with the power supply connector 90 connected can be prevented.

The connector connection surface 76 of the charging connector 75 faces toward the left side where the side stand 17 is provided. However, the connector connection surface 76 may be arranged so as to face toward an opposite side (right side) of the side stand 17. The vehicle body may adopt such a structure that: the battery case 20 is fixed to the vehicle body; and the batteries 40 themselves are attached to and detached from the vehicle body. In this case, the batteries 40 are integrated with the charging connector 75, so that the charging connector 75 can be attached to and detached from the vehicle body integrally with the batteries 40. Further, a part or all of in-vehicle electric components may be accommodated in the battery case 20. The vehicle is only required to be a straddle-type vehicle and may be a vehicle, such as an ATV, including three or more wheels. The charging connector 75 may be arranged in the battery case 20. The electric component cover 26 may be omitted. The present invention is not limited to the above embodiment, and modifications, additions, and eliminations may be made within the scope of the present invention.

INDUSTRIAL APPLICABILITY

As described above, the straddle-type vehicle according to the present invention has excellent effects in which the batteries can be easily attached to and detached from the straddle-type vehicle, and the external power supply connector can be easily attached to and detached from the connector connection portion. It is useful to widely apply the present invention to electric motorcycles and the like which can achieve the significance of these effects.

REFERENCE CHARACTER LIST

1 electric motorcycle (straddle-type vehicle)
6 handle
20 battery case
26 electric component cover
28 upper cover
28*a* connector opening portion
28*c* projecting wall portion
29 connector lid portion
30 seat
40 battery
42 electric motor
46 electric component group
75 charging connector

The invention claimed is:

1. A straddle-type vehicle comprising:
 a seat to be straddled and sat upon by a rider;
 an electric motor configured to generate traveling power for driving a wheel;
 a battery case arranged in front of the seat and accommodating a battery storing DC power to be supplied to the electric motor;
 a charging connector which is arranged above the battery and through which the battery is charged from an external power supply;
 an electric component arranged above the battery case;
 an electric component cover attached at an upper side of the battery case, an electric component space being formed between the electric component cover and the battery case, the electric component space accommodating the electric component; and
 an upper cover provided in front of the seat and covering the electric component cover, wherein:
 the charging connector includes a connector connection surface to which a power supply connector of the external power supply is connected and which faces a vehicle width direction, and the charging connector is attachable to and detachable from a vehicle body integrally with the battery;
 the charging connector is arranged behind the electric component and in front of the seat;
 the charging connector is arranged outside and behind the electric component cover and inside the upper cover; and
 a rear portion of the upper cover is provided with:
  a connector opening portion through which the connector connection surface of the charging connector is exposed toward one side, and
  a connector lid portion configured to close the connector opening portion.

2. The straddle-type vehicle according to claim 1, wherein the rear portion of the upper cover at which the connector lid portion is provided is smaller in size in the vehicle width direction than a middle portion of the upper cover which covers the electric component cover.

3. The straddle-type vehicle according to claim 1, wherein:
 the upper cover includes a projecting wall portion projecting from a peripheral edge of the connector opening portion, formed at an outer wall portion of the upper cover, toward an internal space covered with the upper cover; and
 the charging connector is arranged at the internal space side of a passage defined by the projecting wall portion.

4. A straddle-type vehicle according to claim 1, wherein the charging connector is arranged at a position higher than a front end portion of the seat.

5. The straddle-type vehicle according to claim 1, wherein the charging connector allows the battery to be charged from the external power supply in a state where the battery is attached to a vehicle body.

6. The straddle-type vehicle according to claim 1, further comprising a side stand arranged at one car-width-direction side of a vehicle body, wherein
 the connector connection surface faces toward the one car-width-direction side at which the side stand is arranged.

7. The straddle-type vehicle according to claim 1, wherein the upper cover is configured to be sandwiched between the rider's legs.

* * * * *